United States Patent
Suh (10) Patent No.: US 7,450,514 B2
(45) Date of Patent: Nov. 11, 2008

(54) METHOD AND DEVICE FOR DELIVERING MULTIMEDIA DATA USING IETF QOS PROTOCOLS

(75) Inventor: Doug Young Suh, Seongnam-si (KR)

(73) Assignees: University-Industry Cooperation Group of Kyunghee University, Youngin-Si (KR); Samsung Electronics Co., Ltd., Suwon-Si (KR)

(*) Notice: Subject to any disclaimer, the term of this patent is extended or adjusted under 35 U.S.C. 154(b) by 785 days.

(21) Appl. No.: 10/932,066

(22) Filed: Sep. 2, 2004

(65) Prior Publication Data

US 2005/0047345 A1 Mar. 3, 2005

(30) Foreign Application Priority Data

Sep. 3, 2003 (KR) .................. 10-2003-0061561

(51) Int. Cl.
*H04L 12/26* (2006.01)
(52) U.S. Cl. .................... 370/235.1; 370/236
(58) Field of Classification Search ...... 370/229–235.1, 370/395.21, 395.4–395.43; 375/240.01
See application file for complete search history.

(56) References Cited

U.S. PATENT DOCUMENTS

| | | | | |
|---|---|---|---|---|
| 6,091,777 | A * | 7/2000 | Guetz et al. ............. | 375/240.11 |
| 6,304,551 | B1 * | 10/2001 | Ramamurthy et al. ....... | 370/232 |
| 2002/0097798 | A1 | 7/2002 | Manor | |
| 2003/0056014 | A1 | 3/2003 | Verberkt et al. | |
| 2003/0236904 | A1 * | 12/2003 | Walpole et al. ............. | 709/231 |
| 2005/0002453 | A1 * | 1/2005 | Chang et al. ........... | 375/240.03 |

FOREIGN PATENT DOCUMENTS

KR 10-2004-0009928 1/2004

OTHER PUBLICATIONS

L. Dell 'Uomo et al., "RQDMA: A MAC protocol Supporting QoS in an IP=based Broadband Wireless Local Loop", IEEE, vol. 2, Sep. 23, 2000, pp. 890-895, XP010532370.
P. Francis-Cobley et al., "Performance implications of QoS mapping in heterogeneous networks involving ATM", 1998 1st. IEEE Int'l Conference on ATM. ICATM'98, Conference Proceedings. Colmar, France, Jun. 22-24, 1998, IEEE Int;' Conference on ATM, New York, NY: IEEE, US, Jun. 22, 1998, pp. 529-535, X010290970.
European Search Report dated Oct. 26, 2004.
Notice to Submit Response issued by the Korean Intellectual Property Office on Jun. 30, 2005 in Application No. 10-2003-0061561.

* cited by examiner

*Primary Examiner*—Chi H. Pham
*Assistant Examiner*—Thai Hoang
(74) *Attorney, Agent, or Firm*—Staas & Halsey LLP (57) ABSTRACT

A method and device for delivering multimedia data using IETF QoS protocols. MPEG media data can be transmitted in packet units through a network using the IETF QoS protocol by mapping MPEG media traffic factors onto IETF QoS traffic factors. By encoding or transcoding MPEG media traffic according to a double leaky bucket model indicated by the four factors, a maximum bit rate, a first buffer size, a guaranteed bit rate, and a second buffer size, the MPEG media traffic factors may be transmitted using the IETF QoS protocol without having to go through the process of being mapped onto QoS traffic factors.

17 Claims, 5 Drawing Sheets

| FIG. 3 | ATM | RSVP/INTSERV | 3GPP UMTS | MPEG-4 OD |
|---|---|---|---|---|
| p (304) | PCR | p (PEAKRATE) | MAXIMUM BITRATE | MAX_BITRATE |
| bp (306) | CDVT | M (MAXPACKETSIZE) | MAXIMUMSDUSIZE | MAS_AU_SIZE |
| r (308) | SCR | r (TOKENBUCKETRATE) | GUARANTEED BITRATE | AVERAGEBITRATE |
| b (310) | BT+CDVT | b (TOKENBUCKETSIZE) | k * MAXIMUMSDUSIZE | BUFFERSIZEDB |
| - | CLP 0, 1 | 3BITS:TOS OR DSCP FLOW LABEL | TRAFFIC PRIORITY 1, 2, 3 ALLOCATION PRIORITY 1, 2, 3 QoS RANKING 1-6 | PRIORITY(MPEG-21) |

FIG. 6

METHOD AND DEVICE FOR DELIVERING MULTIMEDIA DATA USING IETF QOS PROTOCOLS

CROSS-REFERENCE TO RELATED APPLICATIONS

This application claims the priority of Korean Patent Application No. 2003-61561, filed on Sep. 3, 2003 in the Korean Intellectual Property Office, the disclosure of which is incorporated herein in its entirety by reference.

BACKGROUND OF THE INVENTION

1. Field of the Invention

The present invention relates to a multimedia data transmission device and method using an Internet Engineering Task Force (IETF) Quality of Service (QoS) protocol.

2. Description of the Related Art

Circuit switching networks were used in the 1990s to transmit digital video information. Due to the fixed bandwidth of such circuit switching networks QoS was guaranteed. In the late 1990s the use of packet switching networks became universal due to the popularity of the Internet. When using such packet exchange networks, various bandwidths can be used. However QoS is not guaranteed because packet exchange networks use a best effort protocol which does not differentiate packets and shares the network resources among all users on the Internet.

The advantages of both circuit switching and packet switching should be used when transmitting video. That is, various bandwidths should be used and QoS should be partially (or completely) guaranteed. The IETF has defined various QoS protocols to meet such needs. Most companies have already started manufacturing routers that support the IETF QoS protocols. IETF QoS protocols are also used in WINDOWS XP, more advanced versions of the WINDOWS series OS, and LINUX. In addition, since IPv6, the next generation Internet protocol that will be widely used before 2010, was standardized in the 1990s when real-time multimedia services started to gain recognition as an important service among the Internet services, the IPv6 is largely different from the existing Internet protocol (IPv4) in that it is easy for IPv6 to use such IETF QoS protocols. The next generation Internet is currently in trial operation and will be commercially adopted and used in wireless networks. The next generation wireless network standard, UMTS (Universal Mobile Telecommunication Systems) is compatible with the QoS control protocol. If the UMTS is realized through AII-IP, IPv6 and the QoS protocol will be widely used.

Meanwhile, in the wireless Internet, fees are charged on a per packet basis and the packet transmission price varies depending on the service and time of use. In addition, demand for services that simultaneously use wired Internet and wireless Internet is increasing. When charging on a per packet basis, issues such as reducing the number of transmitted packets and whether quality can be maintained while reducing the number of high priority packets become very important.

It is an undoubted fact that there will be an increase in the use of the movie picture experts group (MPEG) standard and the Internet, and currently MPEG and the Internet are both used in the communication devices carried by individuals. In the MPEG standard, various standards for multimedia compression and processing are established, while the IETF standards are established for ways of transmitting various information using the Internet. When using these standards set by the two organizations, multimedia transmission is very effective. However since a minimum amount of interfacing is provided between the standards set by the two organizations, many protocols are yet to be effectively used. In particular, years ago the IETF established QoS protocols such as RSVP, diffServ, and intServ, and had them control QoS when transmitting multimedia. However, the MPEG standard does not consider using these methods. That is, the MPEG standard assumes the use of only the packet exchange network, which uses a best effort protocol, and does not define any interface with network layers. Thus, interfacing the packet network with a router on the Internet is impossible. Therefore, when the network is congested the quality of the service (QoS) may deteriorate.

A mechanism that guarantees that loss and delay remain within a predetermined range is needed for multimedia service to be carried out effectively. To realize such a mechanism, functions such as granting priority to packets and resource reservation are used. Routers and operating systems with such functions are already being manufactured. However, since the MPEG standard does not assume the use of such a mechanism, such functions cannot be used. Therefore, an agreement between the MPEG and IETF on the values that quantitatively define the correlation between the network resources and quality of multimedia should be made to use such functions effectively.

Therefore, for the MPEG standard and IETF QoS protocol to be effectively compatible, the type and definition of information exchanged should be coordinated and standardized. In addition, a standard for exchanging information and a procedure of exchanging information should be prepared. Information that should be exchanged are classified with traffic descriptor information and QoS information. In the MPEG standard, traffic related descriptors include DecoderConfigDescriptor and QoS_Descriptor in the ISO/IEC 14496-1 MPEG-4 system, and QoS_metrics in the ISO/IEC 14496-6 MPEG-4 DMIF system (however, complete compatibility between these two does not exist), and such traffic related descriptors should be coordinated to be identical to parameters of Sender_Tspec of the RSVP protocol, which is an IETF standard, and identical to factors in the FlowSpec.

In addition, for the current Internet QoS protocol to be widely used among the traffic descriptors, qualitative elements among the definitions of the traffic descriptors should be changed into quantitative definitions. For example, the packet priority on the Internet has eight levels defining the characteristic of the traffic known as a flow label. However, the methods to use the packet priority and flow label and what levels reserve how much resources are not completely standardized.

Meanwhile, while fees are currently charged monthly by most wired Internet providers, fees are likely to be charged on a per packet basis in the future. Per-packet payment policies have already been implemented for wireless Internet. Therefore, a way of maintaining media quality while minimizing the number of packets and priority of delivery should be sought.

MPEG started out as a standard for compressing and storing multimedia, however real-time transmission through the Internet has become the most important service provided these days. Therefore, all feasible means in the Internet protocol should be used to search for a way to receive differentiated service when transmitting MPEG media.

SUMMARY OF THE INVENTION

In accordance with an aspect of the present invention, a device to effectively transmit MPEG media data by partially modifying a MPEG standard so that a Quality of Service (QoS) protocol of an Internet Engineering Task Force (IETF) can be used within the MPEG standard, modifying quantitative factors so that the MPEG standard and a network class level are compatible within the IETF standard, and mapping traffic of the MPEG, a QoS descriptor, and QoS control procedure onto the IETF QoS protocol and a method thereof are provided.

Additional aspects and/or advantages of the invention will be set forth in part in the description which follows and, in part, will be obvious from the description, or may be learned by practice of the invention.

In an aspect of the present invention, a device for effectively transmitting MPEG media data by reserving a bandwidth and buffer at a router, which exists on a pathway so that QoS is guaranteed even when a network is congested, and a method thereof are provided.

In an aspect of the present invention, a device for effectively transmitting MPEG media data by allowing configuration of priority and an amount of resource (bandwidth, buffer size, etc.) that should be reserved when making a reservation so that a user can decide on the service quality beforehand and a method thereof are provided.

According to an aspect of the present invention, there is provided a multi media data transmission device including: a mapping unit, wherein multi media traffic including a compressed media resource, traffic factors, and QoS factors are analyzed and represented by factors used in a network layer; and a media packet transmitter/receiver unit, wherein multi media data are transmitted in real time through a network according to the represented factors.

According to another aspect of the present invention, there is provided a multi media data transmission method, the method including: reading multimedia traffic including compressed media resources, traffic factors, and QoS factors; mapping the deciphered multimedia traffic onto factors used in a network layer; and transmitting multimedia data through the network using the mapped signals.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
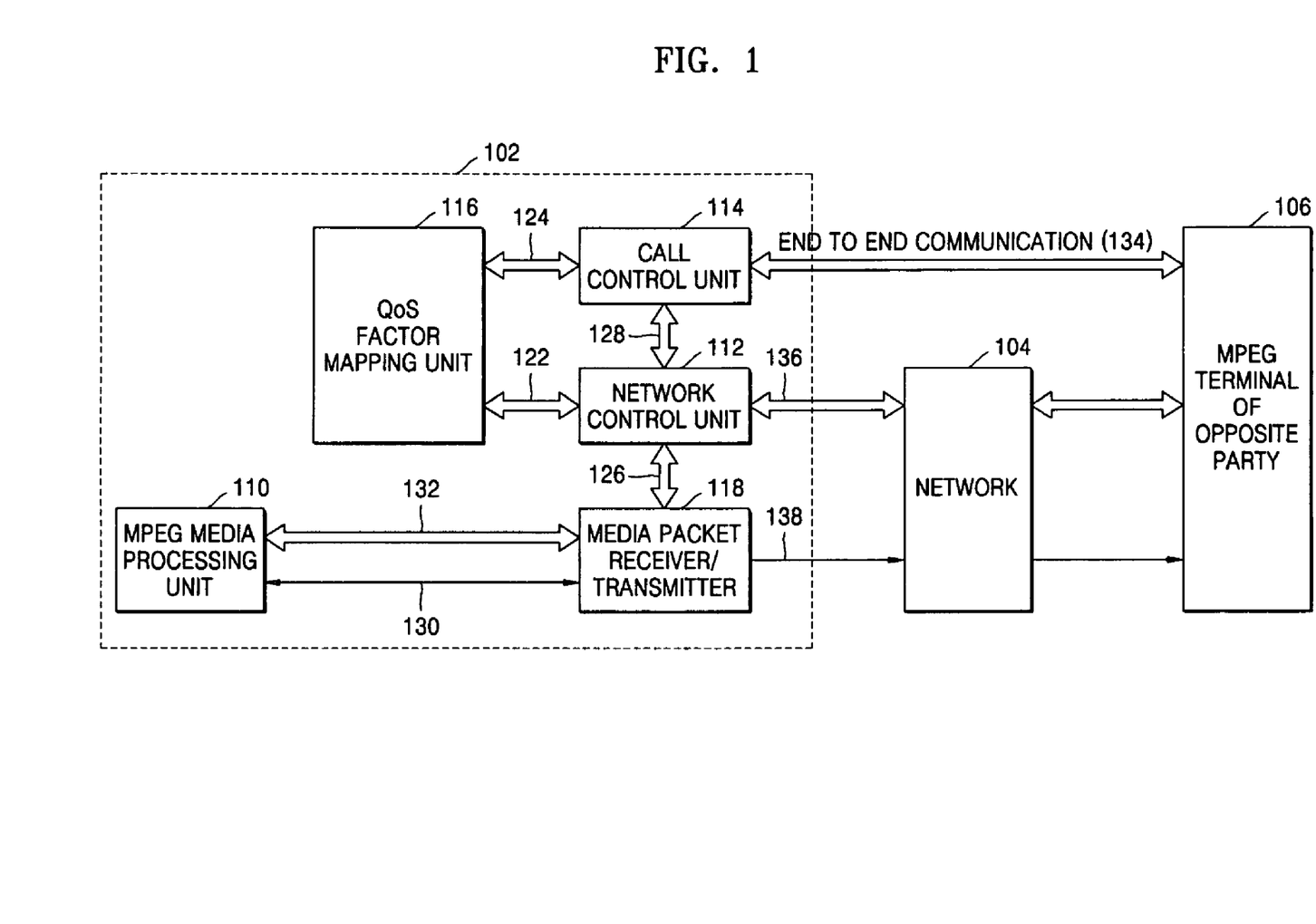
FIG. 1 is a block diagram of a MPEG terminal according to an embodiment of the present invention.

In an exemplary embodiment of the present invention MPEG media data is transmitted using the RSVP/diffServ protocols, which record reservation states only in the routers connected to an MPEG terminal 102.

FIG. 1 is a block diagram of a MPEG terminal according to an embodiment the present invention. Referring to FIG. 1, the MPEG terminal 102 includes a network control unit 112, a call control unit 114, a QoS factor mapping unit 116, a media packet transmitter/receiver 118, and an MPEG media processing unit 110, and can be connected to the MPEG terminal of an opposite party 106 through either a network 104 or an end-to-end communication 134.

The call control unit 114 manages call set-up and call control between the MPEG terminals 102 and 106. Through call set-up and call controlling signals which are control signals exchanged with the MPEG terminal of the opposite party, an Internet address and port number of both parties, a service option, capability exchange parameter of the terminal, and end-to-end QoS specific factors using a real time transmission control protocol (RTCP) are exchanged, and users' demands are relayed. In this case, the set-up and call controlling signals are end-to-end signals and do not need to be read in the network. Meanwhile, network information 128 needed for the network control unit 112 among information included in the set-up and call controlling signals is relayed to the network control unit 112 from the call control unit 114 and is used in a network control signal 136. For example, a portion of the contents of an object descriptor (OD) in a MPEG-4 file can be used as the network information that defines traffic information in the network.

The QoS factor mapping unit 116 reads MPEG compressed media resources, traffic factors, and QoS factors and performs mapping according to the traffic and QoS factors and a priority number used in a network layer. In addition, among the factors used in the MPEG standard to reserve network resources, factors (e.g., a number of media streams, amount of resources required by a media stream) and signals 124 are exchanged with the call control unit 114.

Figure 2:
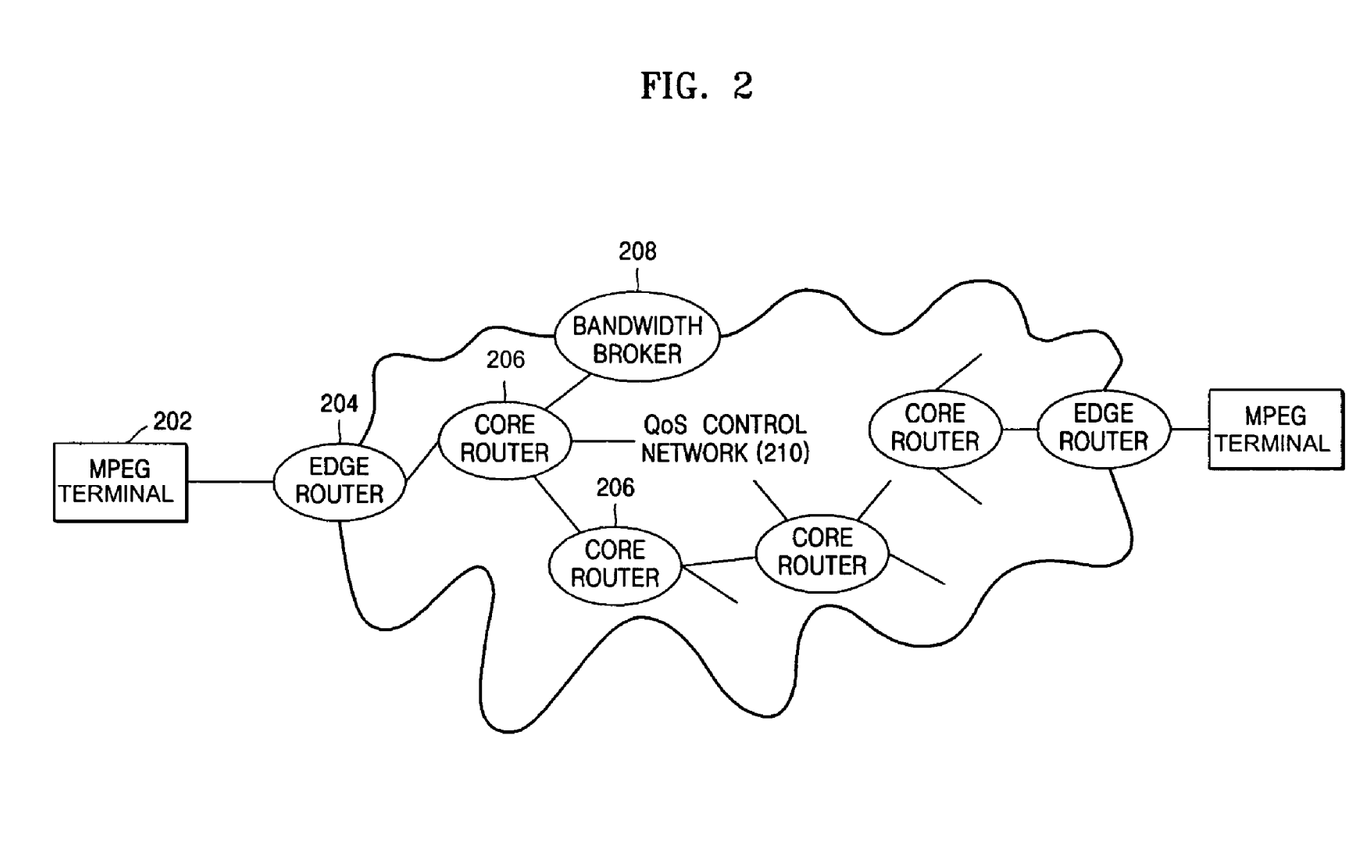
FIG. 2 illustrates the structure of the MPEG terminal and routers which recognize QoS protocols.

Referring to FIG. 2, the network control unit 112 handles call set-up and call control between an MPEG terminal 202 and an edge router 204, and call set-up and call control are performed according to a resource reservation protocol (RSVP) which is an IETF standard. The network control unit 112 reserves resources with the network 104 and exchanges the network control signals 136 containing information on the change of resources in the middle of the process of RSVP. The MPEG-4 DMIF (14496-6) standard includes, an operation to perform call set-up and call control according to the RSVP protocol. Furthermore when performing call set-up in MPEG-21 a process of capability exchange between terminals is expanded to capability exchange between the terminals and the network. In this case, a PATH packet of RSVP and RESV packets are used for call set-up and call control. The PATH packet is used for a path set up between a server and a client. In other words, if the PATH packet moves to a client from a server and confirms the amount of traffic that can be supported in each visit to routers on the way to the client, the confirmed results about the routers will be recorded on a PATH, the client's ability will be transmitted to the RESV packet, and the server decides whether to start the call set-up service by confirming the RESV packet. The specific mapping method of the traffic factor is described in detail below. In addition, the network control unit 112 exchanges the signal mapping the factor used in MPEG onto a factor conforming to the Internet protocol and the signal indicating whether reservations are made with the QoS factor mapping unit 116.

Meanwhile, the priority when transmitting and receiving MPEG video using the IETF protocol is decided by the importance of the data. For example, in MPEG videos, intra frames or intracoded macro blocks are more important than those of uni-directional prediction coding and uni-directional prediction coding is more important than bi-directional prediction encoding. In addition, in intracoding, a DC value is more important than a discrete cosine transform (DCT) coefficient and in prediction coding, motion vector data is more important than the DCT coefficient. In scalable videos, lower layer data is more important than higher layer data. Depending on the importance of the data, the DSCP (Differentiated Services Code Point) value of an Internet IP header is set differently. When indicating the DSCP value using three bits, the importance is expressed with eight different levels. The value of a priority field value of the MPEG-21 traffic descriptor is likely to be the same as the DSCP value in the future. In the future of the Internet, the price of packet transmission is likely to be changed according to priority. For reference, 3GPP expresses priority using six levels, and the priority levels used in MPEG and IETF should be equivalent to the priority levels used in 3GPP. In other words, a priority of 1 is the most important and as the number increases priority goes down. The higher the priority the earlier it is processed in the router, and packets with low priority are the first to be discarded when the router buffer is full. Priorities can be categorized into suspended priority and loss priority. For example, when eight levels, represented by three bits, are used to indicate priority, 1, 2, and 3 can be used as loss priority levels while 4, 5, and 6 can be used as delay priority levels, and the remaining two levels are reserved.

The media packet transmitter/receiver 118 plays the role of transmitting and receiving media packets 138 in real time. A predetermined stream identifier is inserted into the media packet header, of each media packet 138 transmitted. For example, in the next generation Internet protocol (IPv6), a stream identifier is inserted in a traffic class and flow label field. Furthermore, in the media packet transmitter/receiver 118, interleaving takes place with forward error correction (FEC), which is a QoS control method of the transport layer.

In addition, the media packet transmitter/receiver 118 measures a network packet loss rate and round trip time (RTT) using real-time transmission protocol (RTP)/real-time transmission control protocol (RTCP), and transmits signals 122, 124, and 126 to the call control unit 114 through the network control unit 112. The call control unit 114 takes certain measures to change the QoS by using the QoS function of MPEG-21 according to changes of the network QoS. Meanwhile, when the user from either the transmitting party or receiving party requests a QoS change, the call control unit 114 transmits necessary measures for the request process of a QoS change to the media packet transmitter/receiver 118 using signals 122, 124, and 126.

For example, in real-time services such as baseball broadcasting, a control signal 132 is sent to the MPEG media-processing unit 110. Such control signals 132 read the characteristics of the media stream and request changes in traffic volume, and the MPEG media processing unit 110 creates compressed media traffic 130 out of these signals according to leaky bucket models. In a service that streams encoded media, a file server is used instead of the MPEG media processing unit 110, and control signals 132 are used to select a medium and perform traffic shaping.

FIG. 2 illustrates an example of routers that identify the MPEG terminal and QoS protocol according to the embodiments of present invention. As shown in FIG. 2, an edge router 204 is connected to the MPEG terminal 202 and functions as the entrance to the QoS control network 210. Overall QoS is controlled on the basis of an RSVP/diffServ protocol. Therefore an edge router 204 reads the RSVP packet that the MPEG terminal 202 transmits and forwards it to an internal core router 206. If a bandwidth broker 208 exists in the network 210, call allowance can be confirmed. The bandwidth broker 208 adds up a degree of network occupation by traffic class and notifies the edge router 204 of the amount of usable resources when requested. If the amount of resources that are requested by the edge router 204 exceed the usable amount, call allowance is refused. The bandwidth broker 208 identifies real-time service and non-real-time service, and the priority levels of the service classes are classified in the real-time service. In this case, the edge router 204 should be notified about the amount of usable resources so that the edge router 204 may modify its request. Call admission is performed according to service or to media streams within a service. If call set-up is performed, the MPEG terminal 202 transmits the media packet 138, and the edge router 204 reads and identifies the information written in the header of the media packet 138, which has arrived from the MPEG terminal 202, and after identification, writes the traffic class concerning diffServ in the media packet header and performs forwarding. When using multi protocol label switching (MPLS) an adequate label should be used.

Meanwhile, the bandwidth broker 208 determines whether allocated resources are being used by bitstreams and computes a charge by bitstream. Factors such as the number of packets transmitted/received, the priority of the packets, the current congestion rate of the network, the size of the packets, and the security and protection level are used to calculate the amount to charge a user. When computing the amount to charge, credit is accumulated for resources that are not used due to conservation of allocated resources. Results of the charge computation are constantly relayed through the MPEG terminal during service, and after service is finished the final total amount a user will be charged is indicated. In the wireless Internet, edge routers 204 are categorized as either home agents or access points. A home agent indicates the very first edge router that has performed call set-up and an access point indicates an edge router that exists in a base station of a calling cell to which the mobile terminal belongs when in motion. An access point takes over service from the home agent and continuously provides call control so that service may be provided without interruption and the home agent supports call control until the provided service ends. In this case, when a hand off takes place, paths and resources should be secured so that a call is not dropped.

Figure 3:
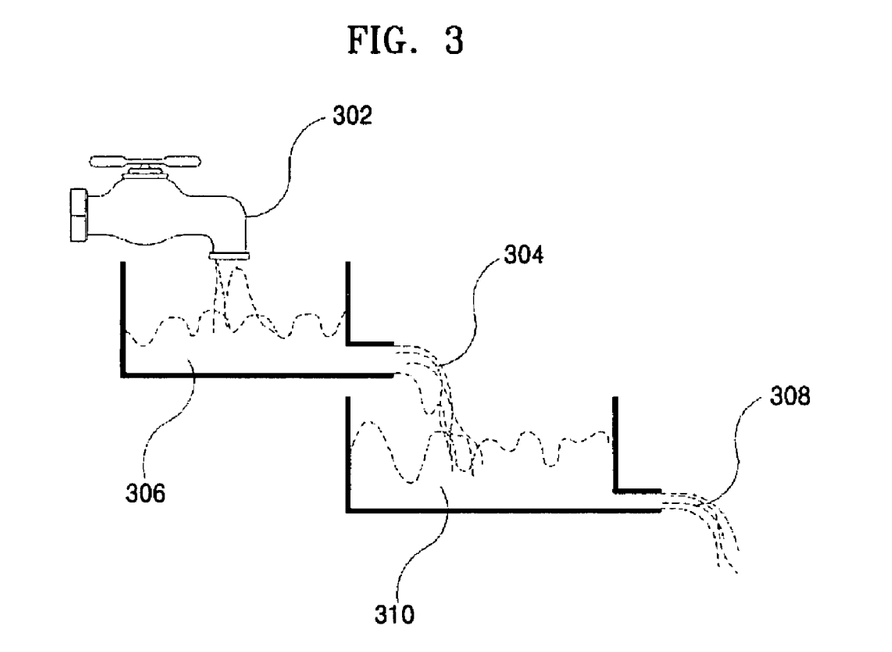
FIG. 3 illustrates the leaky bucket algorithm of an embodiment of the present invention.

FIG. 3 illustrates a double leaky bucket algorithm according to an embodiment of the present invention. As shown in FIG. 3, the double leaky bucket is defined by four factors: maximum bit rate (p) 304; first buffer size (bp) 306; guaranteed bit rate (r) 308; and second buffer size (b) 310. A bit rate for variable bit rate traffic 302 is defined by a maximum permissible average bit rate over a certain period of time and by the minimum buffer size that can be used without the data overflowing when storing data that will exceed a permissible amount in the buffer. A first leaky bucket bit rate refers to the maximum average bit rate 304 when taking an average of the bits over short periods of time, usually within approximately a ms. Transmission is carried out with this average bit rate and if this bit rate is exceeded, the minimum buffer size in which the data does not overflow when storing the data in the buffer and transmitting, is set to the first buffer size 306. Reference numbers 304 and 306 each refer to p and bp in FIG. 6, respectively. The bit rate of the second leaky bucket refers to the guaranteed average bit rate 308 when averaging over long periods of time, usually 100-200 ms. In cases where the bit rate is exceeded, the second buffer size 310 is set to the minimum buffer size that can be used without the data overflowing when storing the data. Reference numbers 308 and 310 each refer to r and b in FIG. 6, respectively.

The MPEG terminal gives out a call admission when performing call set-up or call control on the condition that the sum of p values of all real time traffic does not exceed the maximum bandwidth of a link. A bandwidth equal to p-r, which is the value obtained by subtracting r from the real time traffic p, can be used for non-real-time service.

For compression and transcoding of the MPEG media, the double leaky bucket based control used in the QoS protocol is carried out instead of the existing fixed bit rate control. However, the current MPEG traffic descriptor is not compatible with the double leaky bucket algorithm, and therefore the MPEG traffic descriptors have to be changed to be compatible with (p, bp) and (r, b). A more detailed description of such change will be provided below.

Figure 4:
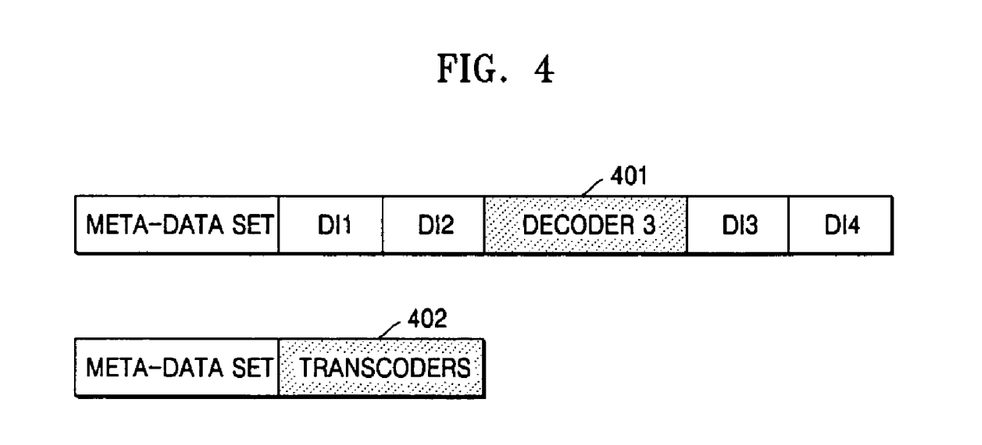
FIG. 4 illustrates an MPEG-21 file format and the packet format of a QoS change command.

FIG. 4 is a modified MPEG-21 file format and a QoS modified order packet format according to an embodiment of the present invention. An MPEG media data decoding program and a transcoding program can be transmitted separately or with the compressed media data. The MPEG-21 file format shown in FIG. 4 illustrates a structure which includes a decoding program 401 and a transcoding program 402. The decoding program 401 and the transcoding program 402 can be transmitted with a QoS signal. It is preferable that such programs be transmitted through credible protocols, for example, a TCP protocol. In addition, when a program is written in JAVA language, the program can be inserted into an execution file regardless of the type of computer on which the program is run. The algorithm used in these programs may also be an algorithm that does not follow a standard and is made arbitrarily by a user to suit the features of the relevant media. However, a descriptor identifying that the algorithm is arbitrary should be included in the MPEG data.

Figure 5:
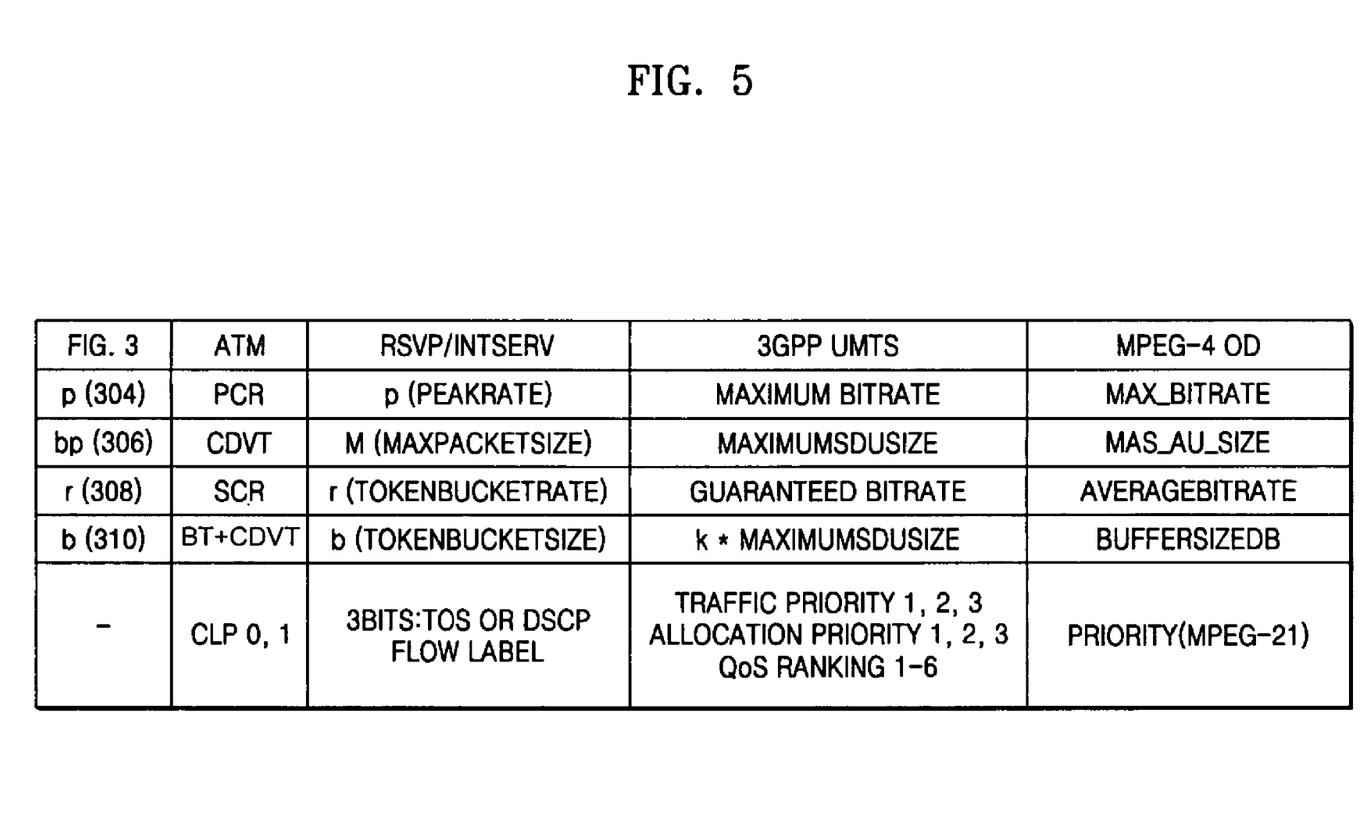
FIG. 5 is a table comparing candidate factors of the MPEG standard with the factors of other protocols.

FIG. 5 is a table, in which candidate factors that can be changed in the MPEG standard are compared with factors related to different protocols. For example, in the asynchronous transmission mode (ATM), (p, bp)=(PCR, CDVT) corresponds to (r, b)=(SCR, BT+CDVT) and in the UMTS standard (European IMT-2000 standard) of the 3GPP, (p, bp)= (maximum bitrate, maximumSDUsize) corresponds to (r, b)= (guaranteed bitrate, k* maximumSDUsize). In Sender_Tspec of the RSVP standard, (p, bp)=(peak rate, maxPacketSize) corresponds to (r, b)=(tokenBucketrate, tokenBucketSize).

Meanwhile, candidate factors related to the MPEG-4 system (ISO/IEC 14496-1) that are changeable include DecodeConfigDescrTag and QoS_Descriptor. DecodeConfigDescrTag includes bufferSizeDB, maxBitrate, and avgBitrate and while maxBitrate corresponds to a maximum bit rate (p), the remaining three factors bp, r, and b cannot be inferred from bufferSizeDB and avgBitrate. MAX_AU_SIZE, AVG_AU_SIZE, and MAX_AU_RATE are the candidate factors most closely related to the QoS_Descriptor, however, to guarantee compatibility with p, bp, r, and b, the definition of the factors should be modified. In addition, QoS_metrics of MPEG-4 DMIF (ISO/IEC 14496-6) also include PRIORITY, MAX_AU_SIZE, AVG_BITRATE, MAX_BITRATE which are also not compatible with p, bp, r, and b. Therefore, the DecoderConfigDescrTag of the current MPEG-4 standard, the QoS_Descriptor, and the QoS_metric factors should be represented with the factors that have the same meaning as p, bp, r, and b without modification. Meanwhile, a NetworkCondition descriptor of MPEG-21 Digital Item Adaptation (DIA) should include factors such as AvailableBandwidth, minimum, maximum, average, and interval, however, these descriptors should also be represented with factors that are equivalent to p, bp, r, and b. The DIA generally specifies natural environment description tools used to adapt digital contents to the network conditions in MPEG-21, such as, for example, location, time and audiovisual environment. Representing the DIA descriptors with factors equivalent to p, bp, r and b, entails changes to the MPEG standard and mapping of RSVP factors to the MPEG descriptors, which will be mentioned in the following embodiment.

Meanwhile, when the traffic descriptors of MPEG, IETF and 3GPP are all equivalent to p, bp, r, and b, the call control unit 114 illustrated in FIG. 1 can be directly connected to the network control unit 112 without going through the QoS factor mapping unit 116.

Also in the case of priority the definition of factors and the meaning of the values of the factors are standardized. One way to coordinate them is to coordinate the six levels of priority used in the 3GPP UMTS standard. The six levels can be divided into three levels of delay priority and three levels of loss priority. In cases of video transmission the loss priority of DC value, motion vector value, intraframe, and base layer data should be increased to guarantee transmission during network congestion. The suspended priority of services such as video conferencing, screen telephones, and live broadcasting is increased to minimize delay.

Figure 6:
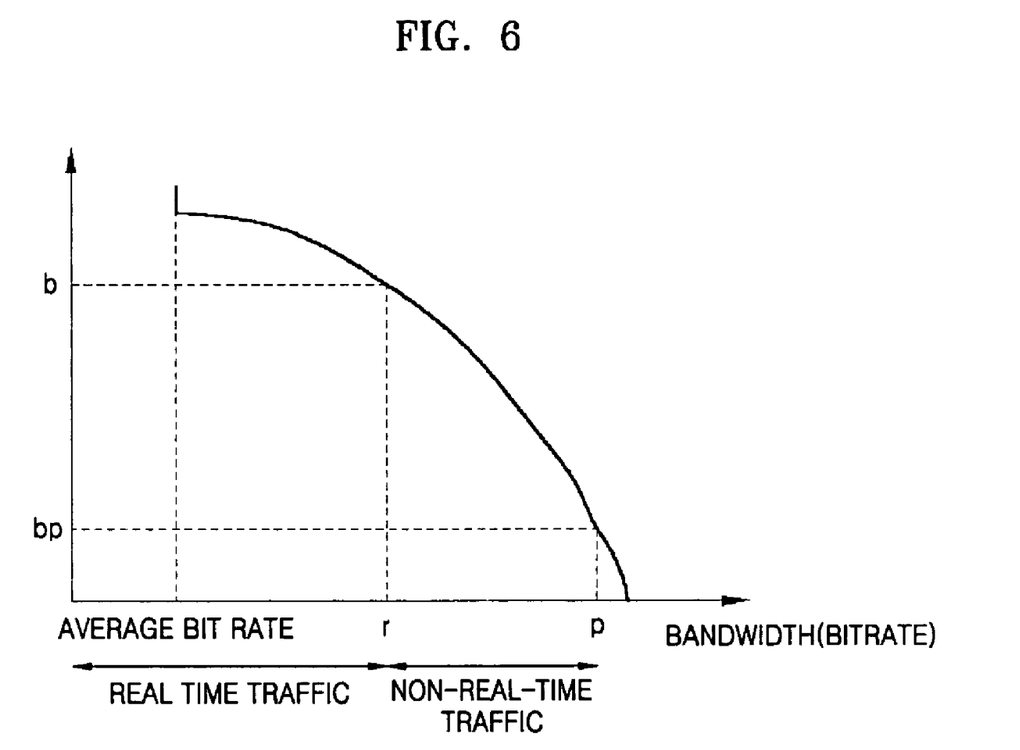
FIG. 6 is a graph illustrating the relationship between the bit rate of the encoding media traffic and buffer size.

P, bp, r, and b factors can be calculated for traffic descriptor mapping. In fixed bit rate traffic, p=r=average bit rate and bp=b=0. In encoded variable bit rate media traffic, using the leaky bucket algorithm, the correlation of the bit rate and buffer size is calculated as a ratio of 1:1. This correlation can be expressed in a graph in which the Y-axis is the buffer size and the X-axis is the bit rate. Although such a graph differs for each media stream, it is always in the form of a uniformly decreasing graph. Therefore, p, bp, r, and b values can be adequately chosen and used according to circumstances by saving the buffer size graph, which is drawn within the range of being larger than the average bit rate and smaller than the maximum bit rate, in the bit stream header or the OD of the MPEG-4 file format. The guaranteed bit rate r is a value between p and the average bit rate. Meanwhile, instead of the double leaky bucket a single leaky bucket could be used by setting p equal to r and bp equal to b.

Meanwhile, in the case of a live service, which is a real time service such as sports or new broadcasting, real-time encoding and transcoding should be performed to satisfy the double leaky bucket limitations that are set. However, an encoding algorithm and a transcoding algorithm are not elements standardized in the MPEG standard. In video data, the maximum size of the encoded frame is set and p is the maximum size of the encoded frame divided by frame duration (e.g., 20 frames during 1 second is 50 ms). The buffer size bp should be equal to approximately 5% of r multiplied by group of pictures (GOP) hours. Since GOPs are consecutive, for the accumulated buffer size to not exceed b, either the quantization value should be controlled, the macro block skipped, or the frame skip method should be used. When the video sequence is simple and the average bit rate is r, if a quantization index, that is a Q value becomes small the Q value should not fall under a predetermined value, for example Q 4. Thus, the bit rate is much lower than the average bit rate and packet transmission expenses are saved.

Embodiments of the present invention transmit MPEG media data using IETF QoS protocol so that the MPEG media data is effectively transmitted according to network circumstances.

Furthermore, according to embodiments of the present invention, transmitting MPEG media data through the Internet by packet differential transmission according to priority is possible, which enables effective multimedia service and charging.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A multi media data transmission device, comprising:
a mapping unit, which analyzes multi media traffic including a compressed media resource, traffic factors, and quality of service (QoS) factors and represents the multimedia traffic by layer factors used in a network layer;
a media packet transmitter/receiver unit, wherein multi media data are transmitted in real time through a network according to the represented factors and the multi media data are MPEG data;
a call control unit, which performs call set-up and call control with other MPEG media data transmission devices, receives QoS change requests from other MPEG media data transmission device users or receives the QoS change requests according to changes in a network environment, and transmits the received QoS change requests to the media packet transmitter/receiver through the mapping unit; and
a MPEG media processing unit producing MPEG media traffic which is changed according to a control signal from the media packet transmitter/receiver,
wherein the media packet transmitter/receiver unit receives the QoS change request from the call control unit and transmits a control signal to the MPEG media processing unit.

2. The device of claim 1, wherein the produced MPEG media traffic is encoded and produced by a double leaky bucket model.

3. The device of claim 2, wherein the double leaky bucket model is expressed by a maximum bit rate, a first buffer size, a guaranteed bit rate, and a second buffer size.

4. The device of claim 3, wherein, when the MPEG media traffic is media traffic encoded in MPEG, the maximum bit rate and the guaranteed bit rate are determined to be equal to an average bit rate while the first buffer size and the second buffer size are determined to be 0, and when the MPEG media traffic is variable bit rate media traffic, the maximum bit rate and the first buffer size, the guaranteed bit rate and the second buffer size correspond, respectively, and the guaranteed bit rate is determined as a value between the maximum bit rate and the average bit rate.

5. The device of claim 3, wherein, when the MPEG media traffic is real-time video traffic, the maximum bit rate is calculated by dividing a maximum size of an encoded frame by a frame duration, the first buffer size is equal to approximately 5% of a value obtained by multiplying the maximum bit rate and the frame duration, the guaranteed bit rate is an average bit rate of group of pictures (GOP), and the second buffer size is determined by approximately 5% of a value obtained by multiplying the guaranteed bit rate with GOP duration.

6. The device of claim 1, further comprising a decoding program decoding the produced MPEG media traffic and a transcoding program,
wherein the decoding program and the transcoding program are transmitted through the network.

7. The device of claim 1, wherein the layer factors used in the network layer are packet priorities, which are compatible with an IETF standard, and IETF QoS protocol factors.

8. A multi media data transmission method, the method comprising:
reading multimedia traffic including compressed media resources, traffic factors, and quality of service (QoS) factors, wherein the multimedia traffic are MPEG media traffic;
mapping the read multimedia traffic onto network factors used in a network layer;
transmitting multimedia data through the network according to the mapped network factors;
producing the MPEG media traffic which is modified according to requests of other users of the network or a QoS change request based on a change in the network environment; and
adding a decoding program decoding the modified MPEG media traffic and a transcoding program to the MPEG media packet and transmitting the MPEG media packet through the network.

9. The method of claim 8, wherein the modified MPEG media traffic is encoded and produced by a double leaky bucket model.

10. The method of claim 9, wherein the double leaky bucket model is expressed by a maximum bit rate, a first buffer size, a guaranteed bit rate, and a second buffer size.

11. The method of claim 8, wherein the network factors used in the network layer are IETF QoS protocol factors.

12. A multi media data transmission method, the method comprising:
reading multimedia traffic including compressed media resources, traffic factors, and quality of service (QoS) factors, wherein the multimedia traffic are MPEG media traffic;
mapping the read multimedia traffic onto network factors used in a network layer; and
transmitting multimedia data through the network according to the mapped network factors;
producing the MPEG media traffic which is modified according to requests of other users of the network or a QoS change request based on a change in the network environment,
wherein the modified MPEG media traffic is encoded and produced by a double leaky bucket model,
the double leaky bucket model is expressed by a maximum bit rate, a first buffer size, a guaranteed bit rate, and a second buffer size, and
when the MPEG media traffic is media traffic encoded in MPEG, the maximum bit rate and the guaranteed bit rate are determined to be equal to an average bit rate of a fixed bit rate media traffic and the first buffer size and second buffer size are determined to be 0, and when the MPEG media traffic is variable bit rate media traffic, the maximum bit rate and the guaranteed bit rate correspond to the first buffer size and the second buffer size, respectively, and the guaranteed bit rate is determined as a value between the maximum bit rate and the average bit rate.

13. A multi media data transmission method, the method comprising:
- reading multimedia traffic including compressed media resources, traffic factors, and quality of service (QoS) factors, wherein the multimedia traffic are MPEG media traffic;
- mapping the read multimedia traffic onto network factors used in a network layer; and
- transmitting multimedia data through the network according to the mapped network factor;
- producing the MPEG media traffic which is modified according to requests of other users of the network or a QoS change request based on a change in the network environment,
- wherein the modified MPEG media traffic is encoded and produced by a double leaky bucket model,
- the double leaky bucket model is expressed by a maximum bit rate, a first buffer size, a guaranteed bit rate, and a second buffer size, and
- when the MPEG media traffic is real-time video traffic, a maximum size of a frame to be encoded divided by frame duration is the maximum bit rate, the first buffer size is approximately 5% of the maximum bit rate multiplied by the frame duration, the guaranteed bit rate is an average bit rate of the group of pictures (GOP), and the second buffer size is approximately 5% of the guaranteed bit rate multiplied by GOP duration.

14. A method transmitting MPEG data between a first terminal and a second terminal over a network, comprising:
- receiving the MPEG data, MPEG traffic factors of the network and a quality of service of the network;
- mapping the MPEG traffic factors onto Internet protocol factors according to a resource reservation protocol;
- transmitting the MPEG data between the first terminal and the second terminal over the network according to the mapped MPEG traffic factors;
- receiving an amount of available network resources if the transmitting the MPEG data exceeds a predetermined amount; and
- adjusting an amount of the MPEG data transmitted according to the received amount of available network resources,
- wherein the adjusting the amount of the MPEG data comprises encoding and compressing the MPEG data according to a double leaky bucket control model,
- the double leaky bucket control model comprises a maximum bit rate, a first buffer size, a guaranteed bit rate, and a second buffer size, and
- when the MPEG data is transmitted by a fixed bit rate, the maximum bit rate and the guaranteed bit rate are each set to an average bit rate and the first buffer size and second buffer size are set to 0.

15. The method of claim 14, wherein the mapping the MPEG traffic factors onto the Internet protocol factors comprises mapping according to IETF quality of service protocol factors.

16. The method of claim 14, further comprising:
- receiving a change in the quality of service of the network; and
- adjusting the MPEG data transmitted according to the changed quality of service.

17. A method transmitting MPEG data between a first terminal and a second terminal over a network, comprising:
- receiving the MPEG data, MPEG traffic factors of the network and a quality of service of the network;
- mapping the MPEG traffic factors onto Internet protocol factors according to a resource reservation protocol;
- transmitting the MPEG data between the first terminal and the second terminal over the network according to the mapped MPEG traffic factors;
- receiving an amount of available network resources if the transmitting the MPEG data exceeds a predetermined amount; and
- adjusting an amount of the MPEG data transmitted according to the received amount of available network resources,
- wherein the adjusting the amount of the MPEG data comprises encoding and compressing the MPEG data according to a double leaky bucket control model,
- the double leaky bucket control model comprises a maximum bit rate, a first buffer size, a guaranteed bit rate, and a second buffer size, and
- when the MPEG data is transmitted by a variable bit rate in real-time, a maximum size of a frame of the MPEG data to be encoded divided by frame duration is the maximum bit rate, the first buffer size is approximately 5% of the maximum bit rate multiplied by the frame duration, the guaranteed bit rate is an average bit rate of the group of pictures, and the second buffer size is approximately 5% of the guaranteed bit rate multiplied by the group of pictures duration.

\* \* \* \* \*

UNITED STATES PATENT AND TRADEMARK OFFICE
CERTIFICATE OF CORRECTION

| | |
|---|---|
| PATENT NO. | : 7,450,514 B2 |
| APPLICATION NO. | : 10/932066 |
| DATED | : November 11, 2008 |
| INVENTOR(S) | : Doug Young Suh |

Page 1 of 1

It is certified that error appears in the above-identified patent and that said Letters Patent is hereby corrected as shown below:

Column 11, Line 10, change "factor;" to --factors;--.

Signed and Sealed this

Seventeenth Day of February, 2009

JOHN DOLL
*Acting Director of the United States Patent and Trademark Office*